United States Patent

[11] 3,532,158

[72] Inventor Adoniram C. Hiebert
    Randallstown, Maryland
[21] Appl. No. 648,047
[22] Filed June 22, 1967
[45] Patented Oct. 6, 1970
[73] Assignee Hittman Associates, Inc.
    Baltimore, Maryland
    a corporation of Maryland

[54] THERMAL CONTROL STRUCTURE
    10 Claims, 6 Drawing Figs.
[52] U.S. Cl. ................................................. 165/47,
    244/1, 165/105, 62/514, 317/100,
    52/615: (By disclosure only)
[51] Int. Cl. ................................................. F24h 3/00
[50] Field of Search ................................. 165/105,
    244/1, 165/105, 62/514, 317/100,

[56] References Cited
    UNITED STATES PATENTS
    2,282,923 5/1942 Ambruster ............... 165/47X
    3,018,087 1/1962 Steele ..................... 165/105
    3,152,774 10/1964 Wyatt ..................... 244/1

3,229,759 1/1966 Grover ..................... 165/105
3,239,164 3/1966 Rapp ....................... 165/105X

OTHER REFERENCES

Bohdansky, J et al. Use of a New Heat Removal System in Space Thermonic Power Supplies EUR 2229.e, pg 8, 1965

Cotter, TP Theory of Heat Pipes LA-3246-MS Los Almos Scientific Laboratory pp 13,14, 3/1965

Haller, HC et al. Feasibility Studies of Space Radiators Using Vapor Chamber Fins Sandia Laboratories SC-M-66-623 pp 51 to 53, 10/1966

RCA, The Heat Pipe Ref 994-619 pg 14, 2/1967

Primary Examiner—Meyer Perlin
Assistant Examiner—Albert W. Davis
Attorney—Fleit, Gipple and Jacobson ABSTRACT: A cellular core is secured between a pair of heat conducting plates. A small amount of a vaporizable heat exchange medium is contained within the cells of the cellular core, with the cells extending from one panel to the other. Heat applied to one of said panels causes vaporization of the heat exchange medium. The vapors flow to the other panel and are condensed, giving up heat through the panel to an external heat sink. The condensate is returned to the hot side panel by a capillary wick to absorb additional heat and continue the operating cycle.

Patented Oct. 6, 1970

INVENTOR
ADONIRAM C. HIEBERT
BY Stevens, Davis, Miller & Mosher
ATTORNEYS

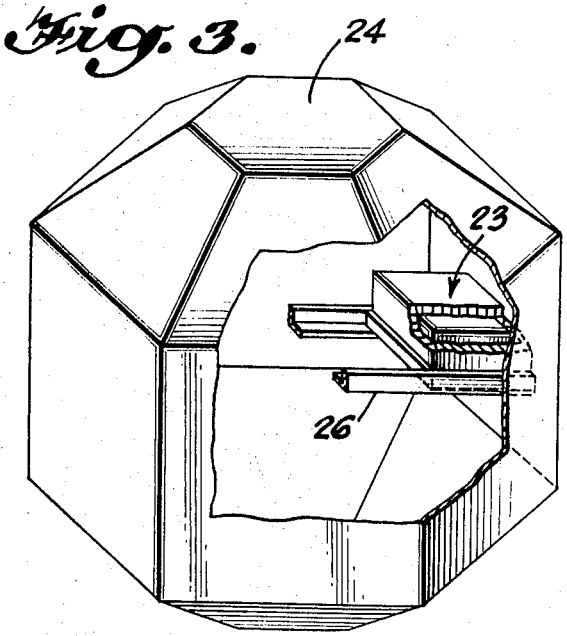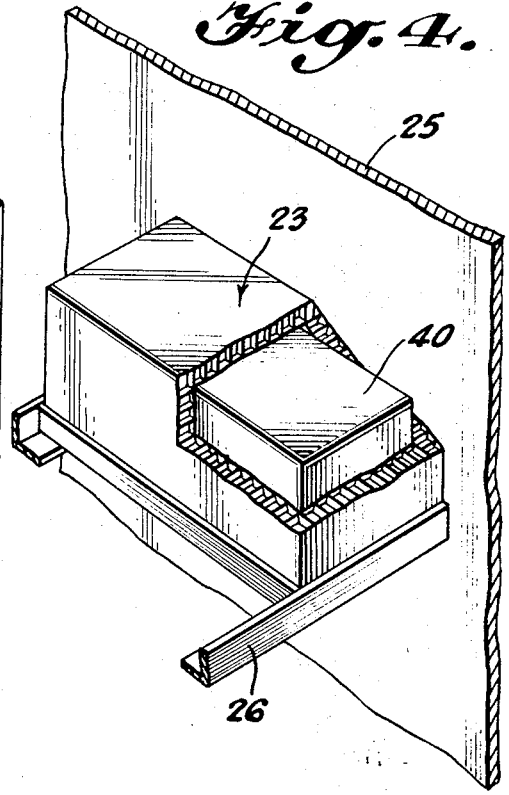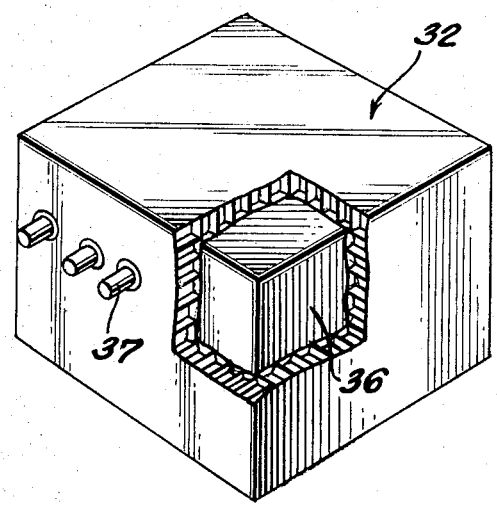

THERMAL CONTROL STRUCTURE

BACKGROUND OF THE INVENTION

This invention relates to lightweight structural panels of the honeycomb type having novel heat transfer characteristics, and to enclosures utilizing such panels.

There has been a longfelt need in the art for a lightweight strong structural entity which would permit efficient thermal control of an enclosure. Ideally, such a structural entity should be able to conduct or convey heat from the enclosure with great efficiency, as when preventing the overheating of certain equipment items, and should also be capable of quickly converting to an efficient heat barrier or insulator as when protecting equipment from rapid and extreme changes in the outside temperature. The structural entity should be shock-resistant and should possess predeterminable abilities to withstand crushing, impact and bending forces. Such an ideal structural entity has not heretofore been obtainable. The well-known honeycomb-type structural panels are ideal from the standpoint of lightness and rigidity but tend to be very poor conductors of heat and inherently possess excessive heat insulating characteristics, rendering them quite unsuitable for the thermal control applications contemplated under this invention.

One prior art disclosure relating to honeycomb panels having novel heat transfer characteristics is U.S. Pat. No. 3,018,087 to Steele issued Jan. 23, 1962. The panels of this patent contain honeycomb cores whose cells are partially filled with an appropriate heat exchange medium which may be vaporized at the hot or evaporator side of the panel and condensed at the other side of the panel. The cells of the panel are disposed so that the hot end of each core is below the other end of the core so that condensate will be returned by gravity from the condenser side to the evaporator side for reuse. Panels of this type can be used only in applications where the condensate may flow by gravity to the side of the panel which is exposed to the heat source, and thus cannot be used in applications where the orientation of the panel may be altered during use. It is evident that a panel which is dependent upon orientation would be ineffective in a situation where the heat source and the evaporator side of the panel are located above the heat sink to which heat is to be transferred since in this case the condensate cannot be returned to the evaporator side of the panel by gravity. Such a panel is also unsuitable for use in any type of spacecraft which is required to function in the absence of a gravitational field.

SUMMARY OF THE INVENTION

The present invention is concerned with providing novel panels of the above-described type which are independent of gravity and of the orientation of the heat source with respect to the heat sink. A panel produced in accordance with the present invention comprises an intermediate cellular core with the open ends of the cells covered and sealed by a pair of heat conductive skin members or plates. The cells are evacuated, and contain wicking material which is either a separately formed element or may be integral with the cellular core material. A small quantity of vaporizable heat exchange medium sufficient to saturate each wick element is contained within each cell, whereby those cells containing wicks and heat exchange medium are adapted to function as heat pipes. The so-called heat pipe principle has been known to the prior art and may be briefly described as follows. The heat pipe is a reflux condenser with fluid return being brought about by capillary action through a wick instead of by gravity. First, fluid boils at the hot end and then its vapor moves down the pipe and condenses at the cool end, transferring energy, and finally the condensate is returned by capillary action of the wick to the hot end of the heat pipe. The heat pipe provides a gravity-free method of conducting large amounts of heat through small areas.

The panels of the invention, and enclosures formed from such panels, are free of the effect of gravity, require no special orientation, and can even operate in the absence of gravity, as in an outer space environment.

When the heat source is at a temperature exceeding the melting point of the heat exchange medium, the panel is an extremely good heat conductor due to the heat pipe operation referred to above. In fact, under such conditions, the core portion of the panel has a heat transfer capacity greatly exceeding the thermal conductivity of pure copper.

When the heat source is at a temperature below the freezing point of the heat exchange medium, the heat exchange medium is frozen and thus the heat pipe cycle is inoperable. Heat transfer in this state is minimal and comprises only that attributable to conductance through the material of the cellular core and to radiation from the hot plate to the cold plate. Under such conditions, the heat conductance of the panel approaches that of an insulator.

The panels of the invention thus may be said to exhibit a switching characteristic whereby the panels may switch from being insulators to being extremely good thermal conductors. This thermal-switching characteristic may be employed as a passive thermal control means, for example, for controlling the internal temperature of an enclosure. Thus, assuming that at startup the temperature of the panel is beneath the freezing point of the heat exchange medium, the panel will initially act as an insulator. As one of the outer plates of the panel is heated (the evaporator side), the heat exchange medium is initially raised to its melting point, and upon the absorption of additional heat is transformed into the liquid state. Upon melting of the heat exchange medium there will usually occur a significant increase in vapor pressure of the medium. However, the significant fact giving rise to a sharp increase in thermal conductivity at the melting point is the fact that the condensed phase of the heat transfer medium abruptly becomes mobile and circulation of the medium from hot to cold wall and back can now occur. The vapor formed will pass through the cells to the cold or condenser side of the panel by virtue of its own pressure, where the vapor condenses giving up its latent heat of condensation to the surrounding heat sink via the cold side outer plate. At this time, the heat conductivity of the panel increases to a point where there is very little temperature differential between the hot and cold sides of the panel so that the panel is able to conduct internal heat out of the enclosure while maintaining the internal temperature of the equipment or other heat source within the enclosure only slightly above the operating vaporization temperature of the heat exchange medium.

In the ideal case wherein no noncondensible gases are present within the cells, there will be no distinct boiling point, but rather a gradual increase in thermal conductivity with temperature as the vapor pressure within the cells increases. It will, of course, be appreciated that the particular heat exchange medium employed will be selected on the basis of its melting point so that the temperature within the enclosure may be maintained within design requirements. During such operating conditions, the rate of heat transfer through the panel is essentially limited only by the capacity of the surrounding heat sink.

When the internal heat generated within the enclosure drops below that required to maintain the heat exchange medium above its melting point, the heat pipe action is terminated, and the panels of the enclosure again become essentially insulating panels.

At ambient temperatures below the melting point of the heat exchange medium, the panels also are effective to insulate the contents of the enclosure from low ambient temperatures such as those which may be encountered in outer space applications. For example, in a typical application of this type, an enclosure utilizing the panels of the invention may surround a battery within a satellite with one wall of the enclosure in heat exchange relationship with a wall of the satellite. When the battery is not operating and thus is not generating heat within the enclosures, the panels of the invention will function to insulate the battery so that the temperature of the battery electrolyte does not drop below the minimum design temperature.

According to one embodiment of the invention, in order to lessen the problem connected with evacuating the cells, it is contemplated that prefabricated cell units containing a "canned" wick and heat exchange medium may be employed. In such an embodiment, individual, self-contained cell units are mounted between the outer plates of the panel.

BRIEF DESCRIPTION OF THE DRAWINGS

FIG. 3 is a perspective view, partly broken away, illustrating an application of the invention for enclosing a space satellite battery.

FIG. 4 is an enlarged fragmentary perspective view of the mounting and enclosure for the battery adjacent one wall of the satellite.

FIG. 5 is a perspective view of an equipment container or enclosure, such as an electronics equipment or enclosure, constructed in accordance with the invention.

DESCRIPTION OF THE PREFERRED EMBODIMENTS

Figure 1:
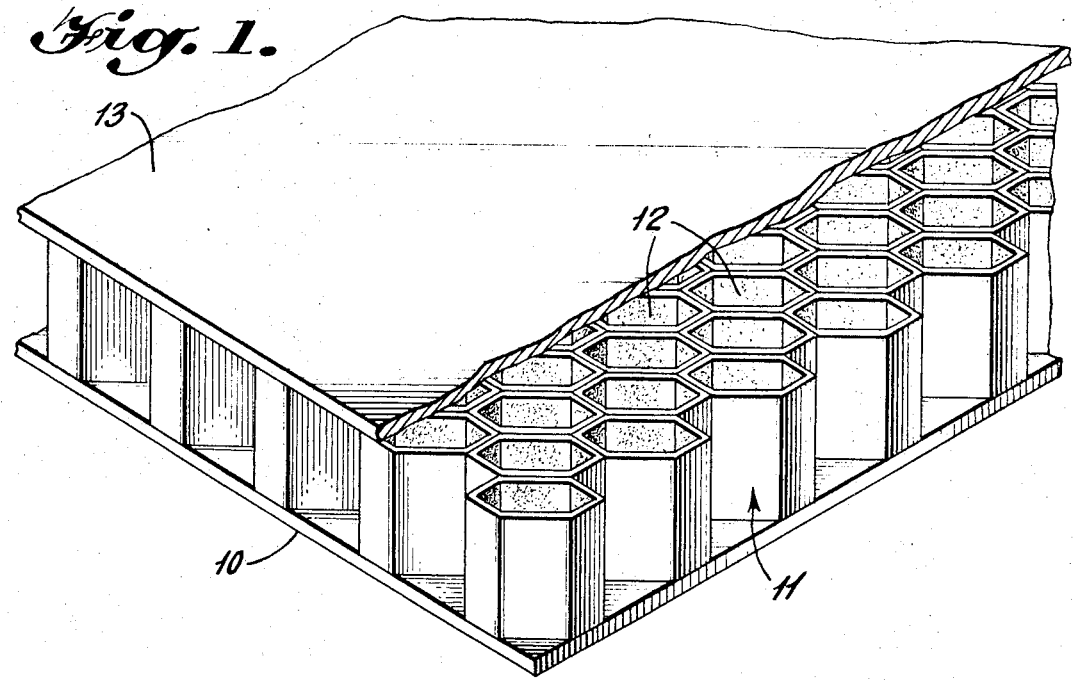
FIG. 1 is a fragmentary perspective view, partly broken away, of a wall section or panel constructed in accordance with the invention according to a preferred embodiment thereof.
Figure 2:
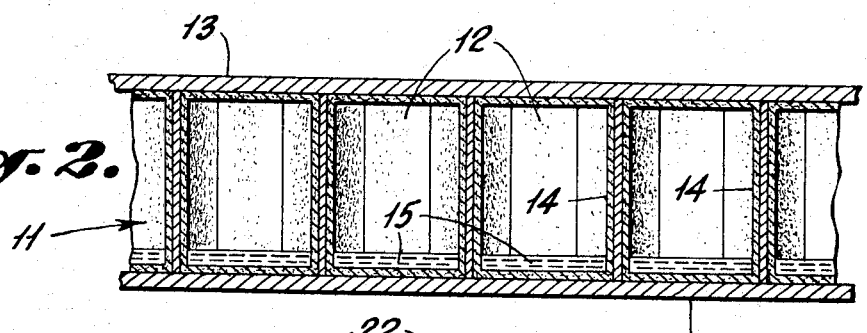
FIG. 2 is a fragmentary vertical sectional view through the structure shown in FIG. 1.

Referring to the drawings, wherein like numerals designate like parts throughout the several views and more particularly to FIGS. 1 and 2, the numeral 10 designates a first or hot side skin or plate element of a panel structure embodying the invention. An intermediate core member 11 of the honeycomb type lies inwardly of the skin 10 and contains a multiplicity of open ended cells 12 whose axes are perpendicular to the skin 10. A second or cold side skin or plate 13 engages the face of the core member remote from the skin 10 and both of the skins 10 and 13 are suitably bonded to the core member 11 so that the open ends of the cells 12 are sealed in a fluid-tight and vacuum-tight manner. The cells 12 are evacuated during the processing of the panel structure by known techniques.

A variety of materials may be employed for the panel structure including metallic and nonmetallic materials, depending upon the desired or required heat transferring characteristics of the structure. For example, the skin elements 10 and 13 which should have good heat conductivity may be formed of stainless steel, aluminum or the like. The core member 11 may also be formed of stainless steel or other metal. However, to minimize heat conduction through the walls of the core member it may be formed of various materials such as polyurethane foam, balsa wood, reinforced plastics, impregnated Kraft paper, or other low density materials which have low coefficients of heat transfer. In any event, the materials selected should be compatible with each other and with the bonding agents employed for joining the parts.

As shown in FIGS. 1 and 2, each cell 12 contains a wick element 14 which lines the walls of cell 12 and the inner surfaces of plates 10 and 13. The wick element is porous in nature and may be formed of fiberglass, metal or plastic wools, mineral wool, cotton, metal gauze or mesh, or like materials. In any event, the wick element must be capable of initiating and supporting a capillary feed of the liquid working fluid utilized in the invention. In some instances, the wick elements 14 may be integral with and formed of the material from which the core member 11 is made as distinguished from separately formed elements. In this latter connection, it is within the scope of the invention to utilize a sufficiently rigid intermediate core member of fibrous or porous material capable of supporting capillary action but which need not have definitely defined cells or compartments. However, from the standpoint of strength coupled with an efficient heat pipe action, a cellular core member is preferred.

Within each of the cells 12, a small quantity 15 of working fluid, i.e. a vaporizable heat exchange medium, is placed, sufficient in amount to completely saturate the associated wick element within the cell. This relatively small amount of fluid does not appreciably increase the weight of the assembly and the total weight including the wicking and working fluid compares favorably with conventional honeycomb-type double-faced paneling.

A variety of working fluids may be utilized depending upon desired operating characteristics and economic considerations. Among the criteria used in selecting a working fluid are its handling properties and chemical compatibility with the materials of the panel structure, ready availability, melting and boiling temperatures, surface tension and latent heat of vaporization. A working fluid with a high latent heat of vaporization will allow the use of a panel with minimum area and maximum heat rejection properties. High surface tension allows for a greater capillary return force, thereby increasing the heat pipe circulation rate and total heat transfer. The melting point of the selected fluid determines whether at a given temperature the panel is a good heat conductor or whether it is essentially an insulator. In many applications, water can be used as the working fluid on the basis of its excellent high latent heat and economy. The use of water in conjunction with fiberglass wicking has proven to be fully operable and efficient within the cells 12 to make each cell a heat pipe. Other working fluids contemplated under the invention include ammonia, ethyl amine, ethyl chloride, methyl chloride, and Freons including trichloromonofluoromethane and dichlorotrafluoroethane.

Figure 2A:
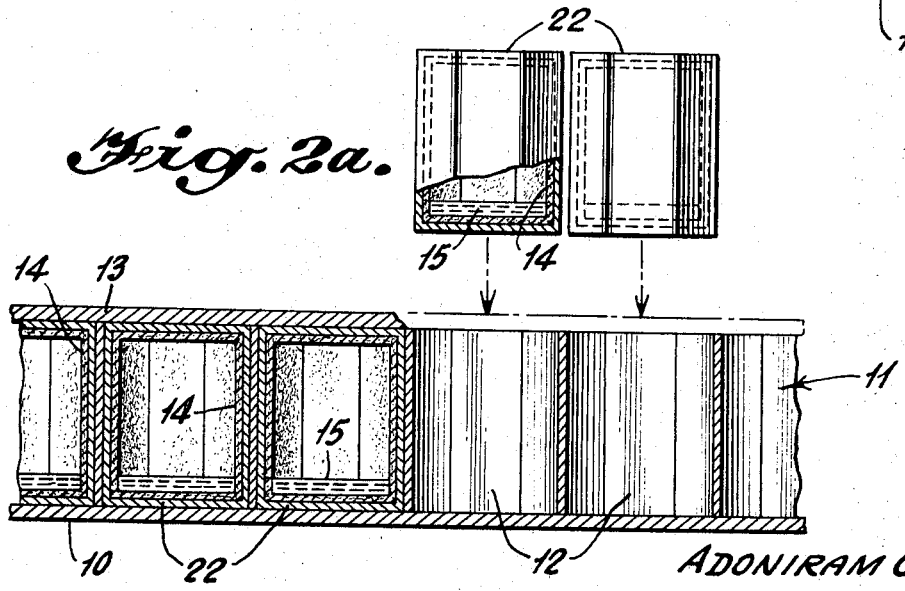
FIG. 2a is a similar sectional view showing a modification.

In order to simplify the fabrication of the invention structure including the step of evacuating the individual cells 12 and maintaining an adequate vacuum, an alternative arrangement shown in FIG. 2a is contemplated. In this FIG., the hot and cold skin elements are shown at 10 and 13 assembled to the intervening cellular core member 11 having individual cells 12, whose opposite ends are defined by portions of the skin elements 10 and 13. To eliminate the necessity for evacuating the cells 12, the capillary wicks 14 and the working fluid 15 for each wick are provided in prefabricated hermetically sealed and vacuumized canlike units 22. One of the units 22 is simply placed in each cell 12 to occupy the full volume thereof so that the end walls of the units 22 abut the adjacent areas of the skins 10 and 13. While the prefabricated units 22 containing the wicking and working fluid add somewhat to the weight of the assembly, they do simplify fabrication and they do not interfere with the operation of the device. That is to say, each cell 12 with one of the canlike units 22 therein will constitute an individual heat pipe. The general mode of operation will remain the same as for the structure shown in FIGS. 1 and 2.

The structures above-described in connection with FIGS. 1 through 2a may readily be embodied in an enclosure or protective barrier for equipment, such as electronics equipment, whose safe operating temperature must be held within a rather strict range. The skin or side 10 of the enclosure which will normally be the hotter of the sides of the panel is next to the equipment which is enclosed and the other side 13 which will normally be the cooler or condenser side will be outermost. When the equipment temperature is such that the inner skin 10 is cool enough for the working fluid 15 to be in the solid state or frozen, the heat pipes are inactive and the enclosure structure has very low conductivity and acts as an efficient insulator, like a conventional honeycomb panel. As the equipment temperature rises, the working fluid 15 in the cells 12 will begin to melt and thereafter vaporizes so that the multitude of heat pipes are activated.

As the heat pipe operating temperature is achieved at the hot side or skin 10 and the working fluid 15 melts and then vaporizes, its vapor pressure will impell the vapor to the cold outer skin 13 and at this outer skin, condensation of the vapor will occur with release of its heat of vaporization to a surrounding heat sink, e.g. the atmosphere. The condensed liquid working fluid will oversaturate the wick 14 at the cold outer skin and will return through the wick in the liquid state by capillary action to the hot skin 10 or evaporator. After the working fluid reaches the melting point and initiates circulation by vaporization and capillary return through the wicking to the inner skin 10, the core structure serves as a superconductor of heat to convey heat away from the equipment and thereby maintains a safe temperature within the enclosure. When the multitude of heat pipes are inactive by virtue of the working fluid having become a solid, the panel structure will insulate the enclosed equipment while at the same time providing a strong, lightweight, shock-proof enclosure therefor much superior to a conventional solid metal enclosure and requiring no auxiliary insulation. and no control equipment such as fans or other forced cooling or heating equipment, except as may be necessary to form a heat sink to receive heat from the condenser side of the panel.

The basic passive thermal control and thermal switching capabilities of the invention are thus based upon a change of state of the working fluid to and from the heat pipe activating condition. Further variation of control can be achieved over a wide range by selection of different materials for the skins 10 and 13 and core member 11, said materials differing in their abilities to conduct heat. Also, the type of working fluid can be changed or varied, as previously discussed. Additionally, selected cells 12 or groups of cells may be left without any working fluid in a random pattern or regular pattern over the core member. In this way, hot spots or cool spots may be established in the enclosure or the degree of heat dissipation controlled.

FIGS. 3 and 4 show the invention applied as a container or enclosure 23 for a battery 40 within a space satellite 24, one wall of the container 23 being in direct thermal contact with one wall 25 of the satellite. The wall 25 and consequently the adjacent wall of enclosure 23 will be subjected to extreme environmental temperature changes. The portion of the wall structure of the container 23 in contact with wall 25 may be formed exactly in accordance with the teachings shown and described in connection with FIGS. 1 through 2a, and therefore the container 23 will be capable of maintaining the satellite battery operating within prescribed limits of temperature. The remaining portions of the wall structure of container 23, those not in contact with wall 25, may be omitted or comprise merely a honeycomb construction without the heat pipe arrangement. The container containing the battery 40 is mounted upon suitable supporting structure 26 of the satellite. The invention is ideally suited for this particular application and similar aerospace applications because the operation of the heat pipes is independent of gravity and requires no orientation. The described migration of the vapor from the hot skin to the cold skin and the return of the liquid through the wick elements by capillary action will take place regardless of the orientation or location of the structure.

In FIG. 5, a container or enclosure 32, whose walls embody the invention as previously described, houses electronic equipment 36, or similar gear whose temperature should be maintained within a predetermined range. Such equipment may include engines, transformers, switch gear, electric motors, batteries and other devices. A plurality of insulated electrical conduits 37 may extend through apertures in one wall of enclosure 32 to the electronic equipment 36. The arrangement is extremely beneficial as it allows complete hermetical sealing of the enclosure and keeps the electronic gear free of dust, moisture and great temperature change.

Apart from the switching feature already described, which is believed to be a very significant contribution of the invention, the honeycomb structure disclosed herein may be useful in the construction of aircraft engine nacelles, or as the housing for any device or apparatus which during its normal operation acts as a heat source or generates heat in amounts which must be dissipated to prevent overheating. Such devices or apparatus normally would not be housed in a honeycomb construction despite its lightweight and strength features because of its recognized insulating properties. For applications such as these, the structure of the present invention would be useful since it combines the light weight and strength features of a conventional honeycomb construction with the excellent heat transmission and dissipation characteristics of a good thermal conductor.

While presently preferred embodiments of the invention have been shown and described, it will be appreciated that many changes and modifications will suggest themselves to those of ordinary skill in the art in view of the present disclosure. Accordingly, it is intended that all such changes and modifications as fall within the scope and spirit of the appended claims are so encompassed.

I claim:

1. A thermal control wall structure comprising: a first heat conducting surface portion in the form of a flat plate normally serving as an evaporator; a second heat conducting surface portion in the form of a flat plate normally serving as a condenser, said second plate being spaced from said first plate; a substantially rigid core member extending between and joined to both said first and said second plates, said core member comprising a plurality of cells covering a substantial portion of said plates, each of said cells being small relative to said flat plates; a plurality of hermetically sealed housing members positioned within at least a portion of said plurality of cells; a porous material capable of serving as a capillary wick lining the inner surface of each housing member; and a working fluid in the form of a heat exchange medium contacting said porous material and adapted to be vaporized at said first surface portion and to be condensed at said second surface portion, and to return by capillary action through said porous material to said first surface portion.

2. A thermal control wall structure according to claim 1 wherein the working fluid consists of a fluid having high latent heat of vaporization, high surface tension and a suitably chosen melting point to provide a thermal switching function at that melting point.

3. A thermal control wall structure according to claim 1 wherein the quantity of said working fluid in each housing is sufficient to saturate the porous material positioned therein.

4. A thermal control wall structure according to claim 1 wherein said porous material consists of a fibrous material.

5. An apparatus comprising: a plurality of panels forming an enclosure, at least one panel comprising a multicellular core member having substantial rigidity and having cells which open through to the opposite major faces of the core member; exterior imperforate cover panels secured to the opposite major faces of the core member and serving to close the open ends of the cells and being in thermal communication with the cells, the cells covering a substantial portion of the cover panels; a plurality of hermetically sealed housing members positioned within at least a portion of said plurality of cells; a porous material capable of serving as a capillary wick lining the inner surface of each housing member; each housing containing an amount of vaporizable heat exchange medium sufficient to substantially saturate the wick and adapted to be vaporized by the heating of one cover panel and to be condensed on the opposite cover panel and then to return by capillary action through the wicks to said one cover panel.

6. Apparatus according to claim 5 wherein the housings are evacuated of substantially all noncondensible gases other than the working fluid.

7. Apparatus according to claim 5 wherein the wick bodies are formed of fiberglass and the heat exchange medium is water.

8. Apparatus according to claim 5 and further comprising a space satellite wherein said apparatus forms a component of said space satellite and further comprising means to mount said enclosure within said satellite with said one panel in heat exchange relationship with a wall of said satellite.

9. Apparatus according to claim 5 and further comprising a heat generating device disposed within said enclosure in heat exchange relationship with said one panel whereby heat generated in said heat generating device may be dissipated.

10. Apparatus according to claim 5 wherein said enclosure forms a closed hermetically sealed housing, electrical equipment is located within said housing in heat exchange relationship therewith, and further comprising electrical conduit means for said equipment extending through said enclosure via hermetic seals.